US008263716B2

(12) United States Patent
Eipper et al.

(10) Patent No.: US 8,263,716 B2
(45) Date of Patent: *Sep. 11, 2012

(54) FLUID POLYESTER MOLDING MASSES

(75) Inventors: Andreas Eipper, Ludwigshafen (DE);
Bernd Bruchmann, Freinsheim (DE);
Dietrich Scherzer, Neustadt (DE);
Jean-Francois Stumbe, Strasbourg
(FR); Carsten Weiss, Ludwigshafen
(DE); Freddy Gruber, Offenbach (DE)

(73) Assignee: BASF Aktiengesellschaft,
Ludwigshafen (DE)

( * ) Notice: Subject to any disclaimer, the term of this patent is extended or adjusted under 35 U.S.C. 154(b) by 71 days.

This patent is subject to a terminal disclaimer.

(21) Appl. No.: 10/587,998

(22) PCT Filed: Feb. 2, 2005

(86) PCT No.: PCT/EP2005/001015
§ 371 (c)(1),
(2), (4) Date: Aug. 1, 2006

(87) PCT Pub. No.: WO2005/075563
PCT Pub. Date: Aug. 18, 2005

(65) Prior Publication Data
US 2007/0173617 A1 Jul. 26, 2007

(30) Foreign Application Priority Data
Feb. 4, 2004 (DE) ......................... 10 2004 005 657

(51) Int. Cl.
*C08G 63/00* (2006.01)

(52) U.S. Cl. ........ 525/444; 524/409; 524/100; 524/126; 524/133; 524/147; 252/601

(58) Field of Classification Search .................... 525/444
See application file for complete search history.

(56) References Cited

U.S. PATENT DOCUMENTS

| 3,305,605 | A | 2/1967 | Hostettler et al. |
|---|---|---|---|
| 3,479,314 | A | 11/1969 | Williams |
| 3,491,048 | A | 1/1970 | Sargent |
| 4,002,581 | A | 1/1977 | Dolce |
| 4,164,114 | A | 8/1979 | Yabuki et al. |
| 4,239,677 | A | 12/1980 | Dieck |
| 4,351,916 | A | 9/1982 | Kohan |
| 4,396,742 | A | 8/1983 | Binsack et al. |
| 4,771,109 | A | 9/1988 | Eichenauer et al. |
| 4,873,289 | A | 10/1989 | Linder et al. |
| 4,882,381 | A | 11/1989 | Wittman et al. |
| 5,010,135 | A | 4/1991 | Eckel et al. |
| 5,136,014 | A | 8/1992 | Figuly |
| 5,144,005 | A | 9/1992 | Sextro et al. |
| 5,157,076 | A | 10/1992 | Greenlee et al. |
| 5,250,595 | A | 10/1993 | Miyashita et al. |
| 5,314,949 | A | 5/1994 | Kozakura et al. |
| 5,348,699 | A | 9/1994 | Meyer et al. |
| 5,399,620 | A | 3/1995 | Niessner et al. |
| 5,480,944 | A | 1/1996 | Aharoni |
| 5,496,887 | A | 3/1996 | Braune |
| 5,608,030 | A | 3/1997 | Hoffmockel et al. |
| 5,621,031 | A | 4/1997 | Leimann et al. |
| 5,712,336 | A * | 1/1998 | Gareiss et al. ................ 524/373 |
| 5,844,059 | A | 12/1998 | Yamamoto et al. |
| 5,998,565 | A | 12/1999 | de Brabander-van den Berg et al. |
| 6,037,444 | A | 3/2000 | Rannard et al. |
| 6,087,449 | A | 7/2000 | Tiefensee et al. |
| 6,225,404 | B1 | 5/2001 | Sorensen et al. |
| 6,232,435 | B1 | 5/2001 | Heitz et al. |
| 6,252,025 | B1 | 6/2001 | Wang et al. |
| 6,262,185 | B1 | 7/2001 | Heitz et al. |
| 6,300,424 | B1 | 10/2001 | Frechet et al. |
| 6,497,959 | B1 | 12/2002 | Mhetar |
| 6,528,612 | B1 | 3/2003 | Brenner et al. |
| 6,541,599 | B1 | 4/2003 | Wang |
| 6,894,112 | B1 | 5/2005 | Weber et al. |
| 7,081,509 | B2 | 7/2006 | Wagner et al. |
| 2002/0120076 | A1 | 8/2002 | Schueler et al. |
| 2002/0161113 | A1 * | 10/2002 | Dvornic et al. ................ 525/100 |
| 2003/0018104 | A1 | 1/2003 | Mours et al. |
| 2003/0069370 | A1 | 4/2003 | Dvornic et al. |
| 2003/0082384 | A1 | 5/2003 | Mhetar |
| 2003/0171503 | A1 | 9/2003 | Adedeji |
| 2004/0138388 | A1 | 7/2004 | Pecorini et al. |
| 2004/0192857 | A1 | 9/2004 | Borer et al. |
| 2004/0220374 | A1 | 11/2004 | Heuer et al. |

(Continued)

FOREIGN PATENT DOCUMENTS
BE 702357 2/1968
(Continued)

OTHER PUBLICATIONS

Carr, et al., "Dielectric and mechanical characterization of aryl ester dendrimer/PET blends", *Polymer*, vol. 37. No. 12, pp. 2395-2401, 1996.
Luman, et al., "The Convergent Synthesis of Poly(glycerol-succinic acid) Dendritic Macromolecules," Chem. Eur. J., vol. 9, pp. 5618-5626, 2003.
Lin, et al., "Polymerization of $A_2$ with $B_3$ Monomers: A Facile Approach to Hyperbranched Poly(aryl ester)s," Macromolecules, vol. 36, pp. 9809-9816, 2003.
Massa, et al., "Novel Blends of Hyperbranched Polyesters and Linear Polymers," Macromolecules, vol. 28, No. 9, pp. 3214-3220, Apr. 24, 1995.
International Preliminary Report on Patentability (Chapter II of the Patent Cooperation Treaty) for International Application PCT/EP2005/001015, dated Feb. 8, 2007.

(Continued)

*Primary Examiner* — Doris Lee
(74) *Attorney, Agent, or Firm* — Connolly Bove Lodge & Hutz LLP

(57) ABSTRACT

Thermoplastic molding compositions comprising
A) from 10 to 99.99% by weight of at least one thermoplastic polyester
B) from 0.01 to 50% by weight of a highly branched or hyperbranched polyester of $A_xB_y$ type where x is at least 1.1 and y is at least 2.1
C) from 0 to 60% by weight of other additives,
where the total of the percentages by weight of components A) to C) is 100%.

17 Claims, No Drawings

U.S. PATENT DOCUMENTS

| | | | |
|---|---|---|---|
| 2005/0025091 | A1 | 2/2005 | Patel et al. |
| 2005/0054812 | A1 | 3/2005 | Wagner et al. |
| 2005/0124779 | A1 | 6/2005 | Shelby et al. |
| 2005/0165177 | A1 | 7/2005 | Wagner et al. |
| 2006/0142442 | A1 | 6/2006 | Scherzer et al. |
| 2008/0015303 | A1 | 1/2008 | Eibeck et al. |

FOREIGN PATENT DOCUMENTS

| | | |
|---|---|---|
| BE | 720658 | 11/1969 |
| CA | 2019904 | 1/1991 |
| CA | 733567 | 5/1996 |
| CA | 2256343 | 12/1997 |
| CA | 2554037 | 8/2005 |
| CA | 2554038 | 8/2005 |
| DE | 222868 | 6/1910 |
| DE | 3725576 | 2/1989 |
| DE | 3800603 | 7/1989 |
| DE | 4307392 | 4/1994 |
| DE | 4328004 | 2/1995 |
| DE | 19953950 | 5/2001 |
| DE | 10132928 | 1/2003 |
| DE | 10136911 | 2/2003 |
| DE | 10147712 | 4/2003 |
| DE | 10163163 | 7/2003 |
| DE | 10240817 | 3/2004 |
| DE | 10251294 | 5/2004 |
| DE | 10304341 | 8/2004 |
| DE | 102004005652 | 8/2005 |
| DE | 102004005657 | 8/2005 |
| DE | 102004057867 | 6/2006 |
| DE | 102005012482 | 9/2006 |
| EP | 0050265 | 4/1982 |
| EP | 0047529 | 6/1985 |
| EP | 0208187 | 1/1987 |
| EP | 0235690 | 9/1987 |
| EP | 0319290 | 6/1989 |
| EP | 0410301 | 1/1991 |
| EP | 0484737 | 5/1992 |
| EP | 0545184 | 6/1993 |
| EP | 0629644 | 12/1994 |
| EP | 0682057 | 11/1995 |
| EP | 0736571 | 10/1996 |
| EP | 1099727 | 5/2001 |
| EP | 1207172 | 5/2002 |
| EP | 1344794 | 9/2003 |
| EP | 1424360 | 6/2004 |
| EP | 1424362 | 6/2004 |
| FR | 2833603 | 6/2003 |
| FR | 2833604 | 6/2003 |
| FR | 2856693 | 12/2004 |
| GB | 1458561 | 12/1976 |
| GB | 1558308 | 12/1979 |
| GB | 2324797 | 11/1998 |
| JP | 4175366 | 6/1992 |
| JP | 2006/100758 | 9/1992 |
| JP | 06157880 | 11/1992 |
| JP | 08269306 | 3/1995 |
| JP | 09157503 | 12/1995 |
| JP | 11060663 | 3/1999 |
| JP | 11255853 | 9/1999 |
| JP | 11279245 | 10/1999 |
| SU | 519449 | 6/1976 |
| WO | WO-96/11962 | 4/1996 |
| WO | WO-97/05705 | 2/1997 |
| WO | WO-97/08241 | 3/1997 |
| WO | WO-97/45474 | 12/1997 |
| WO | WO-98/50453 | 11/1998 |
| WO | WO-2005/58385 | 10/2000 |
| WO | WO-02/32982 | 4/2002 |
| WO | WO-03004546 | 1/2003 |
| WO | WO-03064502 | 8/2003 |
| WO | WO-03093343 | 11/2003 |
| WO | WO-2004/087785 | 10/2004 |
| WO | WO-2004/111126 | 12/2004 |
| WO | WO-2005/012380 | 2/2005 |
| WO | WO-2005/075563 | 8/2005 |
| WO | WO-2005/075565 | 8/2005 |
| WO | WO-2006/018127 | 2/2006 |
| WO | WO-2006/018128 | 2/2006 |
| WO | WO-2006/018179 | 2/2006 |
| WO | WO-2006/040066 | 4/2006 |
| WO | WO-2006/040101 | 4/2006 |
| WO | WO-2006/042673 | 4/2006 |
| WO | WO-2006/048247 | 5/2006 |
| WO | WO-2006/082201 | 8/2006 |
| WO | WO-2006/134115 | 12/2006 |
| WO | WO-2007/009929 | 12/2006 |
| WO | WO-2007/009930 | 1/2007 |
| WO | WO-2008/074687 | 6/2008 |

OTHER PUBLICATIONS

S. Rannard, et al. "A Highly Selective, one-Pot Multiple-Addition Convergent Synthesis of Polycarbonate Dendrimers", J. Am. Chem. Soc. 2000, 122, 11729-11730.

D. Bolton, et al., "Synthesis and Characterization of Hyperbranched Polycarbonates", *Macromolecules* 1997, 30, 1890-1896.

K. Pochner, et al., Treatment of Polymers for subsequent metallization using intense UV radiation or plasma at atmospheric pressure, 1997, 372-377, Surface and Coatings Technology 97.

A. Weber, et al., Metallization of Polymers Using Plasma-Enhanced Chemical Vapor Deposited Titanium Nitride as Interlayer, Mar. 1997, 1131-1135, Journal of the Electrochemical Society, vol. 14, No. 3.

H. Horn, et al., Excimer laser pretreatment and metallization of polymers, 1999, 270-284, Nuclear Instruments and Methods in Physics Research B151.

Gorda, et al., "Star Shaped Condensation Polymers: Synthesis, Characterization, and Blend Properties", Journal of Applied Polymer Science (1993), pp. 1977-1983, vol. 50.

Sunder, et al., "Synthesis and Thermal Behaviour of Esterfied Alipghatic Hyperbranched Polyether Polyols", *Macromolecules* (2000), pp. 1330-1337, vol. 33.

Jang, Jyongsik, et al., "Crystallization Behaviour of Poly (ethylene terephthalate) Blended with Hyperbranched Polmers: The Effect of Terminal Groups and Composition of Hyperbranched Polymers". *Macromolecules*, 2000, 33, 1864-1870, XP-001079109.

Dr. S. Anders, et al., "Polycarbonate Polyacetale Polyester Celluloseester", Carl Hanser Verlag, 1992, pp. 118-119.

International Preliminary Report on Patentability for International Application No. PCT/EP2006/063167, issued Jan. 16, 2008.

International Preliminary Report on Patentability for International Application No. PCT/EP2006/063167, issued Dec. 17, 2007.

International Preliminary Report on Patentability for International Application No. PCT/EP2006/064182, issued Jan. 22, 2008.

International Preliminary Report on Patentability for International Application No. PCT/EP2006/064182, issued Feb. 5, 2008.

International Preliminary Report on Patentability for International Application No. PCT/EP2006/064180, issued Feb. 5, 2008.

International Preliminary Report on Patentability for International Application No. PCT/EP2006/064180, issued Jan. 22, 2008.

International Preliminary Report on Patentability for International Application No. PCT/EP2005/011704, issued May 22, 2007.

International Preliminary Report on Patentability for International Application No. PCT/EP2005/010854.

International Preliminary Report on Patentability for International Application No. PCT/EP2005/010854, issued Nov. 6, 2006.

International Preliminary Report on Patentability for International Application No. PCT/EP2006/042673.

International Preliminary Report on Patentability for International Application No. PCT/EP2006/042673, issued Jan. 12, 2007.

International Preliminary Report on Patentability for International Application No. PCT/EP2006/050590, issued Aug. 14, 2007.

International Preliminary Report on Patentability for International Application No. PCT/EP2006/050590, issued Aug. 7, 2007.

International Preliminary Report on Patentability for International Application No. PCT/EP2005/010762, issued Apr. 24, 2007.

International Preliminary Report on Patentability for International Application No. PCT/EP2005/008339.

International Preliminary Report on Patentability for International Application No. PCT/EP2005/008339, issued Aug. 11, 2006.

* cited by examiner

FLUID POLYESTER MOLDING MASSES

This application is the National Stage of International Application No. PCT/EP2005/001015 filed on Feb. 2, 2005; and this application claims priority of Application No. 102004005657.9 filed in Germany on Feb. 4, 2004 under 35 U.S.C. §119; the entire contents of all are hereby incorporated by reference.

The invention relates to thermoplastic molding compositions comprising
A) from 10 to 99.99% by weight of at least one thermoplastic polyester
B) from 0.01 to 50% by weight of a highly branched or hyperbranched polyester of $A_xB_y$ type where x is at least 1.1 and y is at least 2.1
C) from 0 to 60% by weight of other additives,
where the total of the percentages by weight of components A) to C) is 100%.

The invention further relates to the use of the inventive molding compositions for producing fibers, films, or moldings of any type, and also to the moldings thus obtainable.

To improve flowability, low-molecular-weight additives are usually added to semicrystalline thermoplastics. However, the action of these additives is subject to severe restriction, because, for example, the fall-off in mechanical properties becomes unacceptable when the amount added of the additive exceeds a certain level.

Dendritic polymers with a perfectly symmetrical structure, referred to as dendrimers, can be prepared starting from a central molecule by controlled stepwise linking, two or more at a time, of difunctional or higher polyfunctional monomers to each monomer already bonded. With each linking step there is exponential growth in the number of monomer end groups (and hence of linkages), and polymers are obtained which have treelike structures, ideally spherical, whose branches each contain exactly the same number of monomer units. On the basis of this perfect structure the polymer properties are advantageous; for example, a surprisingly low viscosity is observed, and also a high reactivity, owing to the high number of functional groups on the surface of the sphere. The preparation, however, is complicated by the fact that at each linking step it is necessary to introduce protective groups and remove them again, and purifying operations are necessary, which is why dendrimers are normally prepared only on a laboratory scale.

With industrial processes it is possible, however, to prepare highly branched or hyperbranched polymers. These polymers, in addition to perfect dendritic structures, also feature linear polymer chains and unequal polymer branches, although this does not substantially impair the polymer properties as compared with those of the perfect dendrimers. Hyperbranched polymers can be prepared by two synthesis routes, known as $AB_2$ and $A_x+B_y$. Here, $A_x$ and $B_y$ are different monomers and the indices x and y are the number of functional groups present in A and B respectively, in other words the functionality of A and B. In the case of the $AB_2$ route a trifunctional monomer having one reactive group A and two reactive groups B is converted into a highly branched or hyperbranched polymer. In the case of the $A_x+B_y$ synthesis, depicted using the example of the $A_2+B_3$ synthesis, a difunctional monomer $A_2$ is reacted with a trifunctional monomer $B_3$. The initial product is a 1:1 adduct of A and B having on average one functional group A and two functional groups B, and this adduct can then likewise react to give a highly branched or hyperbranched polymer.

WO-97/45474 discloses thermoplastic compositions which comprise dendrimeric polyesters in the form of an $AB_2$ molecule. Here, a polyhydric alcohol as core molecule reacts with dimethylpropionic acid as $AB_2$ molecule to give a dendrimeric polyester. This contains only OH functionalities at the end of the chain. Disadvantages of these mixtures are the high glass transition temperature of the dendrimeric polyesters, the comparatively complicated preparation process, and especially the poor solubility of the dendrimers in the polyester matrix.

According to the teaching of DE-A 101 32 928, the incorporation of branching agents of this type by means of compounding and solid-phase post-condensation improves mechanical properties (molecular weight increase). Disadvantages of the process variant described are the long preparation time and the disadvantageous properties previously mentioned.

The present invention was therefore based on the object of providing thermoplastic polyester molding compositions which have good flowability together with good mechanical properties.

Accordingly, the molding compositions defined at the outset have been found. Preferred embodiments are given in the subclaims.

The inventive molding compositions comprise, as component (A), from 10 to 99.99% by weight, preferably from 30 to 99.5% by weight, and in particular from 30 to 99.3% by weight, of at least one thermoplastic polyester other than B).

Use is generally made of polyesters A) based on aromatic dicarboxylic acids and on an aliphatic or aromatic dihydroxy compound.

A first group of preferred polyesters is that of polyalkylene terephthalates, in particular those having from 2 to 10 carbon atoms in the alcohol moiety.

Polyalkylene terephthalates of this type are known per se and are described in the literature. Their main chain contains an aromatic ring which derives from the aromatic dicarboxylic acid. There may also be substitution in the aromatic ring, e.g. by halogen, such as chlorine or bromine, or by $C_1$-$C_4$-alkyl, such as methyl, ethyl, iso- or n-propyl, or n-, iso- or tert-butyl.

These polyalkylene terephthalates may be prepared by reacting aromatic dicarboxylic acids, or their esters or other ester-forming derivatives, with aliphatic dihydroxy compounds in a manner known per se.

Preferred dicarboxylic acids are 2,6-naphthalenedicarboxylic acid, terephthalic acid and isophthalic acid, and mixtures of these. Up to 30 mol %, preferably not more than 10 mol %, of the aromatic dicarboxylic acids may be replaced by aliphatic or cycloaliphatic dicarboxylic acids, such as adipic acid, azelaic acid, sebacic acid, dodecanedioic acids and cyclohexanedicarboxylic acids.

Preferred aliphatic dihydroxy compounds are diols having from 2 to 6 carbon atoms, in particular 1,2-ethanediol, 1,3-propanediol, 1,4-butanediol, 1,6-hexanediol, 1,4-hexanediol, 1,4-cyclohexanediol, 1,4-cyclohexanedimethanol and neopentyl glycol, and mixtures of these.

Particularly preferred polyesters (A) are polyalkylene terephthalates derived from alkanediols having from 2 to 6 carbon atoms. Among these, particular preference is given to polyethylene terephthalate, polypropylene terephthalate and polybutylene terephthalate, and mixtures of these. Preference is also given to PET and/or PBT which comprise, as other monomer units, up to 1% by weight, preferably up to 0.75% by weight, of 1,6-hexanediol and/or 2-methyl-1,5-pentanediol. The viscosity number of the polyesters (A) is generally in the range from 50 to 220, preferably from 80 to 160

(measured in 0.5% strength by weight solution in a phenol/o-dichlorobenzene mixture in a weight ratio of 1:1 at 25° C.) in accordance with ISO 1628.

Particular preference is given to polyesters whose carboxyl end group content is up to 100 mval/kg of polyester, preferably up to 50 mval/kg of polyester and in particular up to 40 mval/kg of polyester. Polyesters of this type may be prepared, for example, by the process of DE-A 44 01 055. The carboxyl end group content is usually determined by titration methods (e.g. potentiometry).

Particularly preferred molding compositions comprise, as component A), a mixture of polyesters other than PBT, for example polyethylene terephthalate (PET). The proportion of the polyethylene terephthalate, for example, in the mixture is preferably up to 50% by weight, in particular from 10 to 35% by weight, based on 100% by weight of A).

It is also advantageous to use recycled PET materials (also termed scrap PET) if appropriate mixed with polyalkylene terephthalates, such as PBT.

Recycled materials are generally:
1) those known as post-industrial recycled materials: these are production wastes during polycondensation or during processing, e.g. sprues from injection molding, start-up material from injection molding or extrusion, or edge trims from extruded sheets or films.
2) post-consumer recycled materials: these are plastic items which are collected and treated after utilization by the end consumer. Blow-molded PET bottles for mineral water, soft drinks and juices are easily the predominant items in terms of quantity.

Both types of recycled material may be used either as ground material or in the form of pellets. In the latter case, the crude recycled materials are separated and purified and then melted and pelletized using an extruder. This usually facilitates handling and free flow, and metering for further steps in processing.

The recycled materials used may either be pelletized or in the form of regrind. The edge length should not be more than 10 mm, preferably less than 8 mm.

Because polyesters undergo hydrolytic cleavage during processing (due to traces of moisture) it is advisable to predry the recycled material. The residual moisture content after drying is preferably <0.2%, in particular <0.05%.

Another group to be mentioned is that of fully aromatic polyesters deriving from aromatic dicarboxylic acids and aromatic dihydroxy compounds.

Suitable aromatic dicarboxylic acids are the compounds previously mentioned for the polyalkylene terephthalates. The mixtures preferably used are made from 5 to 100 mol % of isophthalic acid and from 0 to 95 mol % of terephthalic acid, in particular from about 50 to about 80% of terephthalic acid and from 20 to about 50% of isophthalic acid.

The aromatic dihydroxy compounds preferably have the formula

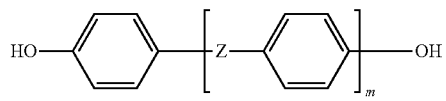

where Z is alkylene or cycloalkylene having up to 8 carbon atoms, arylene having up to 12 carbon atoms, carbonyl, sulfonyl, oxygen or sulfur, or a chemical bond, and m is from 0 to 2. The phenylene groups of the compounds may also have substitution by $C_1$-$C_6$-alkyl or alkoxy and fluorine, chlorine or bromine.

Examples of parent compounds for these compounds are
dihydroxybiphenyl,
di(hydroxyphenyl)alkane,
di(hydroxyphenyl)cycloalkane,
di(hydroxyphenyl) sulfide,
di(hydroxyphenyl) ether,
di(hydroxyphenyl) ketone,
di(hydroxyphenyl) sulfoxide,
α,α'-di(hydroxyphenyl)dialkylbenzene,
di(hydroxyphenyl) sulfone, di(hydroxybenzoyl)benzene,
resorcinol, and
hydroquinone, and also the ring-alkylated and ring-halogenated derivatives of these.

Among these, preference is given to
4,4'-dihydroxybiphenyl,
2,4-di(4'-hydroxyphenyl)2-methylbutane,
α,α'-di(4-hydroxyphenyl)-p-diisopropylbenzene,
2,2-di(3'-methyl-4'-hydroxyphenyl)propane, and
2,2-di(3'-chloro-4'-hydroxyphenyl)propane,
and in particular to
2,2-di(4'-hydroxyphenyl)propane
2,2-di(3',5-dichlorodihydroxyphenyl)propane,
1,1-di(4'-hydroxyphenyl)cyclohexane,
3,4'-dihydroxybenzophenone,
4,4'-dihydroxydiphenyl sulfone and
2,2-di(3',5'-dimethyl-4'-hydroxyphenyl)propane
and mixtures of these.

It is, of course, also possible to use mixtures of polyalkylene terephthalates and fully aromatic polyesters. These generally comprise from 20 to 98% by weight of the polyalkylene terephthalate and from 2 to 80% by weight of the fully aromatic polyester.

It is, of course, also possible to use polyester block copolymers, such as copolyether-esters. Products of this type are known per se and are described in the literature, e.g. in U.S. Pat. No. 3,651,014. Corresponding products are also available commercially, e.g. Hytrel® (DuPont).

According to the invention, polyesters include halogen-free polycarbonates. Examples of suitable halogen-free polycarbonates are those based on diphenols of the formula

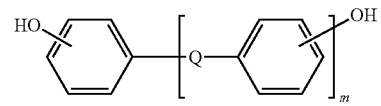

where Q is a single bond, $C_1$-$C_8$-alkylene, $C_2$-$C_3$-alkylidene, $C_3$-$C_6$-cycloalkylidene, $C_6$-$C_{12}$arylene, or —O—, —S— or —SO$_2$—, and m is a whole number from 0 to 2.

The phenylene radicals of the diphenols may also have substituents, such as $C_1$-$C_6$-alkyl or $C_1$-$C_6$-alkoxy.

Examples of preferred diphenols of the formula are hydroquinone, resorcinol, 4,4'-dihydroxybiphenyl, 2,2-bis(4-hydroxyphenyl)propane, 2,4-bis(4-hydroxyphenyl)-2-methylbutane and 1,1-bis(4-hydroxyphenyl)cyclohexane. Particular preference is given to 2,2-bis(4-hydroxyphenyl)propane and 1,1-bis(4-hydroxyphenyl)cyclohexane, and also to 1,1-bis(4-hydroxyphenyl)-3,3,5-trimethylcyclohexane.

Either homopolycarbonates or copolycarbonates are suitable as component A, and preference is given to the copolycarbonates of bisphenol A, as well as to bisphenol A homopolymer.

Suitable polycarbonates may be branched in a known manner, specifically by incorporating 0.05 to 2.0 mol %, based on the total of the biphenols used, of at least trifunctional compounds, for example those having three or more phenolic OH groups.

Polycarbonates which have proven particularly suitable have relative viscosities $n_{rel}$ of from 1.10 to 1.50, in particular from 1.25 to 1.40. This corresponds to an average molar mass $M_w$ (weight-average) of from 10 000 to 200 000 g/mol, preferably from 20 000 to 80 000 g/mol.

The diphenols of the formula are known per se or can be prepared by known processes.

The polycarbonates may, for example, be prepared by reacting the diphenols with phosgene in the interfacial process, or with phosgene in the homogeneous-phase process (known as the pyridine process), and in each case the desired molecular weight may be achieved in a known manner by using an appropriate amount of known chain terminators. (In relation to polydiorganosiloxane-containing polycarbonates see, for example, DE-A 33 34 782).

Examples of suitable chain terminators are phenol, p-tert-butylphenol, or else long-chain alkylphenols, such as 4-(1,3-tetramethylbutyl)phenol as in DE-A 28 42 005, or monoalkylphenols, or dialkylphenols with a total of from 8 to 20 carbon atoms in the alkyl substituents as in DE-A-35 06 472, such as p-nonylphenyl, 3,5-di-tert-butylphenol, p-tert-octylphenol, p-dodecylphenol, 2-(3,5-dimethylheptyl)phenol and 4-(3,5-dimethylheptyl)phenol.

For the purposes of the present invention, halogen-free polycarbonates are polycarbonates made from halogen-free biphenols, from halogen-free chain terminators and, if used, halogen-free branching agents, where the content of subordinate amounts at the ppm level of hydrolyzable chlorine, resulting, for example, from the preparation of the polycarbonates with phosgene in the interfacial process, is not regarded as meriting the term halogen-containing for the purposes of the invention. Polycarbonates of this type with contents of hydrolyzable chlorine at the ppm level are halogen-free polycarbonates for the purposes of the present invention.

Other suitable components A) which may be mentioned are amorphous polyester carbonates, where during the preparation process phosgene has been replaced by aromatic dicarboxylic acid units, such as isophthalic acid and/or terephthalic acid units. Reference may be made at this point to EP-A 711 810 for further details.

EP-A 365 916 describes other suitable copolycarbonates having cycloalkyl radicals as monomer units.

It is also possible for bisphenol A to be replaced by bisphenol TMC. Polycarbonates of this type are obtainable from Bayer with the trademark APEC HT®.

The inventive molding compositions comprise, as component B), from 0.01 to 50% by weight, preferably from 0.5 to 20% by weight, and in particular from 0.7 to 10% by weight, of a hyperbranched polyester of $A_xB_y$ type, where
x is at least 1.1, preferably at least 1.3, in particular at least 2
y is at least 2.1, preferably at least 2.5, in particular at least 3.

Use may also be made of mixtures as units A and/or B, of course.

An $A_xB_y$-type polyester is a condensate composed of an x-functional molecule A and a y-functional molecule B. By way of example, mention may be made of a polyester composed of adipic acid as molecule A (x=2) and glycerol as molecule B (y=3). For the purposes of this invention, hyperbranched polyesters are non-crosslinked macromolecules having hydroxy groups and carboxy groups, these having both structural and molecular non-uniformity. Their structure may firstly be based on a central molecule in the same way as dendrimers, but with non-uniform chain length of the branches. Secondly, they may also have a linear structure with functional pendant groups, or else they combine the two extremes, having linear and branched molecular portions. See also P. J. Flory, J. Am. Chem. Soc. 1952, 74, 2718, and H. Frey et al., Chem. Eur. J. 2000, 6, No.14, 2499 for the definition of dendrimeric and hyperbranched polymers.

"Hyperbranched" in the context of the present invention means that the degree of branching (DB), i.e. the average number of dendritic linkages plus the average number of end groups per molecule, is from 10 to 99.9%, preferably from 20 to 99%, particularly preferably from 20 to 95%.

"Dendrimer" in the context of the present invention means that the degree of branching is from 99.9 to 100%. See H. Frey et al., Acta Polym. 1997, 48, 30 for the definition of "degree of branching".

The degree of branching (DB) of the compounds in question is defined as $$DB = \frac{T+Z}{T+Z+L} \times 100\%,$$

(where T is the average number of terminal monomer units, Z the average number of branched monomer units and L the average number of linear monomer units in the macromolecules of the respective compounds).

Component B) preferably has an $M_n$ of from 300 to 30 000 g/mol, in particular from 400 to 25 000 g/mol, and very particularly from 500 to 20 000 g/mol, determined by means of GPC, PMMA standard, dimethylacetamide eluent.

B) preferably has an OH number of from 0 to 600 mg KOH/g of polyester, preferably of from 1 to 500 mg KOH/g of polyester, in particular from 20 to 500 mg KOH/g of polyester to DIN 53240, and preferably a COOH number of from 0 to 600 mg KOH/g of polyester, preferably from 1 to 500 mg KOH/g of polyester, and in particular from 2 to 500 mg KOH/g of polyester.

The $T_g$ is preferably from −50° C. to 140° C., and in particular from −50 to 100° C. (by means of DSC, to DIN 53765).

Preference is particularly given to those components B) in which at least one OH or COOH number is greater than 0, preferably greater than 0.1, and in particular greater than 0.5.

The inventive component B) is in particular obtainable via the processes described below, namely by reacting
(a) one or more dicarboxylic acids or one or more derivatives of the same with one or more at least trihydric alcohols
or
(b) one or more tricarboxylic acids or higher polycarboxylic acids or one or more derivatives of the same with one or more diols
in the presence of a solvent and optionally in the presence of an inorganic, organometallic, or low-molecular-weight organic catalyst, or of an enzyme. The reaction in solvent is the preferred preparation method.

For the purposes of the present invention, highly functional hyperbranched polyesters have molecular and structural non-uniformity. Their molecular non-uniformity distinguishes them from dendrimers, and they can therefore be prepared at considerably lower cost.

Among the dicarboxylic acids which can be reacted according to variant (a) are, by way of example, oxalic acid, malonic acid, succinic acid, glutaric acid, adipic acid, pimelic acid, suberic acid, azelaic acid, sebacic acid, undecane-α,ω-dicarboxylic acid, dodecane-α,ω-dicarboxylic acid, cis- and trans-cyclohexane-1,2-dicarboxylic acid, cis- and trans-cyclohexane-1,3-dicarboxylic acid, cis- and trans-cyclohexane-1,4-dicarboxylic acid, cis- and trans-cyclopentane-1,2-dicarboxylic acid, and cis- and trans-cyclopentane-1,3-dicarboxylic acid, and the abovementioned dicarboxylic acids may have substitution by one or more radicals selected from $C_1$-$C_{10}$-alkyl groups, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl groups, such as cyclopropyl, cyclobutyl, cyclopentyl, cyclohexyl, cycloheptyl, cyclooctyl, cyclononyl, cyclodecyl, cycloundecyl and cyclododecyl; preference is given to cyclopentyl, cyclohexyl, and cycloheptyl;

alkylene groups, such as methylene or ethylidene, or $C_6$-$C_{14}$-aryl groups, such as phenyl, 1-naphthyl, 2-naphthyl, 1-anthryl, 2-anthryl, 9-anthryl, 1-phenanthryl, 2-phenanthryl, 3-phenanthryl, 4-phenanthryl, and 9-phenanthryl, preferably phenyl, 1-naphthyl, and 2-naphthyl, particularly preferably phenyl.

Examples which may be mentioned of representatives of substituted dicarboxylic acids are: 2-methylmalonic acid, 2-ethylmalonic acid, 2-phenylmalonic acid, 2-methylsuccinic acid, 2-ethylsuccinic acid, 2-phenylsuccinic acid, itaconic acid, 3,3-dimethylglutaric acid.

Among the dicarboxylic acids which may be reacted according to variant (a) are also ethylenically unsaturated acids, such as maleic acid and fumaric acid, and aromatic dicarboxylic acids, such as phthalic acid, isophthalic acid or terephthalic acid.

It is also possible to use mixtures of two or more of the abovementioned representative compounds.

The dicarboxylic acids may either be used as they stand or be used in the form of derivatives.

Derivatives are preferably the relevant anhydrides in monomeric or else polymeric form, mono- or dialkyl esters, preferably mono- or dimethyl esters, or the corresponding mono- or diethyl esters, or else the mono- and dialkyl esters derived from higher alcohols, such as n-propanol, isopropanol, n-butanol, isobutanol, tert-butanol, n-pentanol, n-hexanol, and also mono- and divinyl esters, and mixed esters, preferably methyl ethyl esters.

In the preferred preparation process it is also possible to use a mixture composed of a dicarboxylic acid and one or more of its derivatives. Equally, it is possible to use a mixture of two or more different derivatives of one or more dicarboxylic acids.

It is particularly preferable to use succinic acid, glutaric acid, adipic acid, phthalic acid, isophthalic acid, terephthalic acid, or the mono- or dimethyl ester thereof. It is very particularly preferable to use adipic acid.

Examples of at least trihydric alcohols which may be reacted are: glycerol, butane-1,2,4-triol, n-pentane-1,2,5-triol, n-pentane-1,3,5-triol, n-hexane-1,2,6-triol, n-hexane-1,2,5-triol, n-hexane-1,3,6-triol, trimethylolbutane, trimethylolpropane or ditrimethylolpropane, trimethylolethane, pentaerythritol or dipentaerythritol; sugar alcohols, such as mesoerythritol, threitol, sorbitol, mannitol, or mixtures of the above at least trihydric alcohols. It is preferable to use glycerol, trimethylolpropane, trimethylolethane, and pentaerythritol.

Examples of tricarboxylic acids or polycarboxylic acids which may be reacted according to variant (b) are benzene-1,2,4-tricarboxylic acid, benzene-1,3,5-tricarboxylic acid, benzene-1,2,4,5-tetracarboxylic acid, and mellitic acid.

Tricarboxylic acids or polycarboxylic acids may be used in the inventive reaction either as they stand or else in the form of derivatives.

Derivatives are preferably the relevant anhydrides in monomeric or else polymeric form, mono-, di-, or trialkyl esters, preferably mono-, di-, or trimethyl esters, or the corresponding mono-, di-, or triethyl esters, or else the mono-, di-, and triesters derived from higher alcohols, such as n-propanol, isopropanol, n-butanol, isobutanol, tert-butanol, n-pentanol, n-hexanol, or else mono-, di-, or trivinyl esters and mixed methyl ethyl esters.

For the purposes of the present invention, it is also possible to use a mixture composed of a tri- or polycarboxylic acid and one or more of its derivatives. For the purposes of the present invention it is likewise possible to use a mixture of two or more different derivatives of one or more tri- or polycarboxylic acids, in order to obtain component B). Examples of diols used for variant (b) of the present invention are ethylene glycol, propane-1,2-diol, propane-1,3-diol, butane-1,2-diol, butane-1,3-diol, butane-1,4-diol, butane-2,3-diol, pentane-1,2-diol, pentane-1,3-diol, pentane-1,4-diol, pentane-1,5-diol, pentane-2,3-diol, pentane-2,4-diol, hexane-1,2-diol, hexane-1,3-diol, hexane-1,4-diol, hexane-1,5-diol, hexane-1,6-diol, hexane-2,5-diol, heptan-1,2-diol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyclopentanediols, cyclohexanediols, inositol and derivatives, (2)-methylpentane-2,4-diol, 2,4-dimethylpentane-2,4-diol, 2-ethylhexane-1,3-diol, 2,5-dimethylhexane-2,5-diol, 2,2,4-trimethylpentane-1,3-diol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representative compounds of the above compounds, where n is a whole number and n=4 to 25. One, or else both, hydroxy groups here in the abovementioned diols may also be substituted by SH groups. Preference is given to ethylene glycol, propane-1,2-diol, and diethylene glycol, triethylene glycol, dipropylene glycol, and tripropylene glycol.

The molar ratio of the molecules A to molecules B in the $A_xB_y$ polyester in the variants (a) and (b) is from 4:1 to 1:4, in particular from 2:1 to 1:2.

The at least trihydric alcohols reacted according to variant (a) of the process may have hydroxy groups all of which have identical reactivity. Preference is also given here to at least trihydric alcohols whose OH groups initially have identical reactivity, but where reaction with at least one acid group can induce a fall-off in reactivity of the remaining OH groups as a result of steric or electronic effects. By way of example, this applies when trimethylolpropane or pentaerythritol is used.

However, the at least trihydric alcohols reacted according to variant (a) may also have hydroxy groups having at least two different chemical reactivities.

The different reactivity of the functional groups here may either derive from chemical causes (e.g. primary/secondary/tertiary OH group) or on steric causes.

By way of example, the triol may comprise a triol which has primary and secondary hydroxy groups, preferred example being glycerol.

When the inventive reaction is carried out according to variant (a), it is possible to use triol or mixtures of triols which contain up to 50 mol % (based on the polyol mixture) of difunctional alcohols, although it is preferred to operate in the absence of diols and monofunctional alcohols.

When the inventive reaction is carried out according to variant (b), it is possible to use the tricarboxylic acids or mixtures thereof, which may contain up to 50 mol %, based on the acid mixture, of difunctional carboxylic acids, although it is preferred to operate in the absence of mono- or dicarboxylic acids.

The inventive process is preferably carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents in the absence of acidic catalysts are: ethers, such as dioxane or tetrahydrofuran, and ketones, such as methyl ethyl ketone and methyl isobutyl ketone.

According to the invention, the amount of solvent added is at least 0.1% by weight, based on the weight of the starting materials used and to be reacted, preferably at least 1% by weight, and particularly preferably at least 10% by weight. It is also possible to use excesses of solvent, based on the weight of starting materials used and to be reacted, e.g. from 1.01 to 10 times the amount. Solvent amounts of more than 100 times the weight of the starting materials used and to be reacted are not advantageous, because the reaction rate reduces markedly at markedly lower concentrations of the reactants, giving uneconomically long reaction times.

To carry out the process preferred according to the invention, operations may be carried out in the presence of a dehydrating agent as additive, added at the start of the reaction. Suitable examples are molecular sieves, in particular 4 Å molecular sieve, $MgSO_4$, and $Na_2SO_4$. During the reaction it is also possible to add further dehydrating agent or to replace dehydrating agent by fresh dehydrating agent. During the reaction it is also possible to remove the water or alcohol formed by distillation and, for example, to use a water separator.

The reaction may be carried out in the absence of acidic catalysts. It is preferable to operate in the presence of an acidic inorganic, organometallic, or organic catalyst, or a mixture composed of two or more acidic inorganic, organometallic, or organic catalysts.

For the purposes of the present invention, examples of acidic inorganic catalysts are sulfuric acid, phosphoric acid, phosphonic acid, hypophosphorous acid, aluminum sulfate hydrate, alum, acidic silica gel (pH=6, in particular=5), and acidic aluminum oxide. Examples of other compounds which may be used as acidic inorganic catalysts are aluminum compounds of the general formula $Al(OR)_3$ and titanates of the general formula $Ti(OR)_4$, where each of the radicals R may be identical or different and is selected independently of the others from $C_1$-$C_{10}$-alkyl radicals, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, 2-ethylhexyl, n-nonyl, and n-decyl, $C_3$-$C_{12}$-cycloalkyl radicals, such as cyclopropyl, cyclobutyl, cyclopentyl, cyclohexyl, cycloheptyl, cyclooctyl, cyclononyl, cyclodecyl, cycloundecyl, and cyclododecyl; preference is given to cyclopentyl, cyclohexyl, and cycloheptyl.

Each of the radicals R in $Al(OR)_3$ or $Ti(OR)_4$ is preferably identical and selected from isopropyl or 2-ethylhexyl.

Examples of preferred acidic organometallic catalysts are selected from dialkyltin oxides $R_2SnO$, where R is defined as above. A particularly preferred representative compound for acidic organometallic catalysts is di-n-butyltin oxide, which is commercially available as "oxo-tin", or di-n-butyltin dilaurate.

Preferred acidic organic catalysts are organic compounds having, by way of example, phosphate groups, sulfonic acid groups, sulfate groups, or phosphonic acid groups. Particular preference is given to sulfonic acids, such as para-toluenesulfonic acid. Acidic ion exchangers may also be used as acid organic catalysts, e.g. polystyrene resins containing sulfonic acid groups and crosslinked with about 2 mol % of divinylbenzene.

It is also possible to use combinations of two or more of the abovementioned catalysts. It is also possible to use an immobilized form of those organic or organometallic, or else inorganic catalysts which take the form of discrete molecules.

If the intention is to use acidic inorganic, organometallic, or organic catalysts, according to the invention the amount used is from 0.1 to 10% by weight, preferably from 0.2 to 2% by weight, of catalyst.

The inventive process is carried out under inert gas, e.g. under carbon dioxide, nitrogen, or a noble gas, among which mention may particularly be made of argon.

The inventive process is carried out at temperatures of from 60 to 200° C. It is preferable to operate at temperatures of from 130 to 180° C., in particular up to 150° C., or below that temperature. Maximum temperatures up to 145° C. are particularly preferred, and temperatures up to 135° C. are very particularly preferred.

The pressure conditions for the inventive process are not critical per se. It is possible to operate at markedly reduced pressure, e.g. at from 10 to 500 mbar. The inventive process may also be carried out at pressures above 500 mbar. A reaction at atmospheric pressure is preferred for reasons of simplicity; however, conduct at slightly increased pressure is also possible, e.g. up to 1200 mbar. It is also possible to operate at markedly increased pressure, e.g. at pressures up to 10 bar. Reaction at atmospheric pressure is preferred.

The reaction time for the inventive process is usually from 10 minutes to 25 hours, preferably from 30 minutes to 10 hours, and particularly preferably from one to 8 hours.

Once the reaction has ended, the highly functional hyperbranched polyesters can easily be isolated, e.g. by removing the catalyst by filtration and concentrating the mixture, the concentration process here usually being carried out at reduced pressure.

Other work-up methods with good suitability are precipitation after addition of water, followed by washing and drying.

Component B) can also be prepared in the presence of enzymes or decomposition products of enzymes (according to DE-A 101 63163). For the purposes of the present invention, the term acidic organic catalysts does not include the dicarboxylic acids reacted according to the invention.

It is preferable to use lipases or esterases. Lipases and esterases with good suitability are *Candida cylindracea, Candida lipolytica, Candida rugosa, Candida antarctica, Candida utilis, Chromobacterium viscosum, Geolrichum viscosum, Geotrichum candidum, Mucor javanicus, Mucor mihei,* pig pancreas, *pseudomonas* spp., *pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii,* or esterase from *Bacillus* spp. and *Bacillus thermoglucosidasius. Candida antarctica* lipase B is particularly preferred. The enzymes listed are commercially available, for example from Novozymes Biotech Inc., Denmark.

The enzyme is preferably used in immobilized form, for example on silica gel or Lewatit®. The processes for immobilizing enzymes are known per se, e.g. from Kurt Faber, "Biotransformations in organic chemistry", 3rd edition 1997, Springer Verlag, Chapter 3.2 "Immobilization" pp. 345-356. Immobilized enzymes are commercially available, for example from Novozymes Biotech Inc., Denmark.

The amount of immobilized enzyme used is from 0.1 to 20% by weight, in particular from 10 to 15% by weight, based on the total weight of the starting materials used and to be reacted.

The inventive process is carried out at temperatures above 60° C. It is preferable to operate at temperatures of 100° C. or below that temperature. Preference is given to temperatures up to 80° C., very particular preference is given to temperatures of from 62 to 75° C., and still more preference is given to temperatures of from 65 to 75° C.

The inventive process is carried out in the presence of a solvent. Examples of suitable compounds are hydrocarbons, such as paraffins or aromatics. Particularly suitable paraffins are n-heptane and cyclohexane. Particularly suitable aromatics are toluene, ortho-xylene, meta-xylene, para-xylene, xylene in the form of an isomer mixture, ethylbenzene, chlorobenzene and ortho- and meta-dichlorobenzene. Other very particularly suitable solvents are: ethers, such as dioxane or tetrahydrofuran, and ketones, such as methyl ethyl ketone and methyl isobutyl ketone.

The amount of solvent added is at least 5 parts by weight, based on the weight of the starting materials used and to be reacted, preferably at least 50 parts by weight, and particularly preferably at least 100 parts by weight. Amounts of more than 10 000 parts by weight of solvent are undesirable, because the reaction rate decreases markedly at markedly lower concentrations, giving uneconomically long reaction times.

The inventive process is carried out at pressures above 500 mbar. Preference is given to the reaction at atmospheric pressure or slightly increased pressure, for example at up to 1200 mbar. It is also possible to operate under markedly increased pressure, for example at pressures up to 10 bar. The reaction at atmospheric pressure is preferred.

The reaction time for the inventive process is usually from 4 hours to 6 days, preferably from 5 hours to 5 days, and particularly preferably from 8 hours to 4 days.

Once the reaction has ended, the highly functional hyperbranched polyesters can easily be isolated, e.g. by removing the catalyst by filtration and concentrating the mixture, the concentration process here usually being carried out at reduced pressure. Other work-up methods with good suitability are precipitation after addition of water, followed by washing and drying.

The present invention also provides the highly functional, hyperbranched polyesters obtainable by the inventive process. They have particularly low content of discolored and resinified material. For the definition of hyperbranched polymers, see also: P. J. Flory, J. Am. Chem. Soc. 1952, 74, 2718, and A. Sunder et al., Chem. Eur. J. 2000, 6, No.1, 1-8. However, in the context of the present invention, "highly functional hyperbranched" means that the degree of branching, i.e. the average number of dendritic linkages plus the average number of end groups per molecule is from 10 to 99.9%, preferably from 20 to 99%, particularly preferably from 30 to 90% (see in this connection H. Frey et al. Acta Polym. 1997, 48, 30).

The inventive polyesters have a molar mass $M_w$ of from 500 to 50 000 g/mol, preferably from 1000 to 20 000 g/mol, particularly preferably from 1000 to 19 000 g/mol. The polydispersity is from 1.2 to 50, preferably from 1.4 to 40, particularly preferably from 1.5 to 30, and very particularly preferably from 1.5 to 10. They are usually very soluble, i.e. clear solutions can be prepared using up to 50% by weight, in some cases even up to 80% by weight, of the inventive polyesters in tetrahydrofuran (THF), n-butyl acetate, ethanol, and numerous other solvents, with no gel particles detectable by the naked eye.

The inventive highly functional hyperbranched polyesters are carboxy-terminated, carboxy- and hydroxy-terminated, and preferably hydroxy-terminated.

The inventive molding compositions may comprise, as component C), from 0 to 60% by weight, in particular up to 50% by weight, of other additives and processing aids, other than B).

The inventive molding compositions may comprise, as component C), from 0 to 5% by weight, preferably from 0.05 to 3% by weight, and in particular from 0.1 to 2% by weight, of at least one ester or amide of saturated or unsaturated aliphatic carboxylic acids having from 10 to 40 carbon atoms, preferably from 16 to 22 carbon atoms, with aliphatic saturated alcohols or amines having from 2 to 40 carbon atoms, preferably from 2 to 6 carbon atoms.

The carboxylic acids may be monobasic or dibasic. Examples which may be mentioned are pelargonic acid, palmitic acid, lauric acid, margaric acid, dodecanedioic acid, behenic acid, and particularly preferably stearic acid, capric acid, and also montanic acid (a mixture of fatty acids having from 30 to 40 carbon atoms).

The aliphatic alcohols may be mono- to tetrahydric. Examples of alcohols are n-butanol, n-octanol, stearyl alcohol, ethylene glycol, propylene glycol, neopentyl glycol, pentaerythritol, preference being given to glycerol and pentaerythritol.

The aliphatic amines may be mono-, di- or triamines. Examples of these are stearylamine, ethylenediamine, propylenediamine, hexamethylenediamine, di(6-aminohexyl) amine, particular preference being given to ethylenediamine and hexamethylenediamine. Correspondingly, preferred esters or amides are glycerol distearate, glycerol tristearate, ethylenediamine distearate, glycerol monopalmitate, glyceryl trilaurate, glyceryl monobehenate, and pentaerythrityl tetrastearate.

It is also possible to use mixtures of various esters or amides, or esters with amides combined, the mixing ratio here being as desired.

Examples of amounts of other usual additives C) are up to 40% by weight, preferably up to 30% by weight, of elastomeric polymers (also often termed impact modifiers, elastomers, or rubbers).

These are very generally copolymers which have preferably been built up from at least two of the following monomers: ethylene, propylene, butadiene, isobutene, isoprene, chloroprene, vinyl acetate, styrene, acrylonitrile and acrylates and/or methacrylates having from 1 to 18 carbon atoms in the alcohol component.

Polymers of this type are described, for example, in Houben-Weyl, Methoden der organischen Chemie, Vol. 14/1 (Georg-Thieme-Verlag, Stuttgart, Germany, 1961), pages 392-406, and in the monograph by C. B. Bucknall, "Toughened Plastics" (Applied Science Publishers, London, 1977).

Some preferred types of such elastomers are described below.

Preferred types of such elastomers are those known as ethylene-propylene (EPM) and ethylene-propylene-diene (EPDM) rubbers.

EPM rubbers generally have practically no residual double bonds, whereas EPDM rubbers may have from 1 to 20 double bonds per 100 carbon atoms.

Examples which may be mentioned of diene monomers for EPDM rubbers are conjugated dienes, such as isoprene and butadiene, non-conjugated dienes having from 5 to 25 carbon atoms, such as 1,4-pentadiene, 1,4-hexadiene, 1,5-hexadiene, 2,5-dimethyl-1,5-hexadiene and 1,4-octadiene, cyclic dienes, such as cyclopentadiene, cyclohexadienes, cyclooctadienes and dicyclopentadiene, and also alkenylnorbornenes, such as 5-ethylidene-2-norbornene, 5-butylidene-2-norbornene, 2-methallyl-5-norbornene and 2-isopropenyl-5-norbornene, and tricyclodienes, such as 3-methyltricyclo[5.2.1.0$^{2,6}$]-3,8-decadiene, and mixtures of these. Preference is given to 1,5-hexadiene, 5-ethylidenenorbornene and dicyclopentadiene. The diene content of the EPDM rubbers is preferably from 0.5 to 50% by weight, in particular from 1 to 8% by weight, based on the total weight of the rubber.

EPM and EPDM rubbers may preferably also have been grafted with reactive carboxylic acids or with derivatives of these. Examples of these are acrylic acid, methacrylic acid and derivatives thereof, e.g. glycidyl (meth)acrylate, and also maleic anhydride.

Copolymers of ethylene with acrylic acid and/or methacrylic acid and/or with the esters of these acids are another group of preferred rubbers. The rubbers may also include dicarboxylic acids, such as maleic acid and fumaric acid, or derivatives of these acids, e.g. esters and anhydrides, and/or monomers containing epoxy groups. These monomers containing dicarboxylic acid derivatives or containing epoxy groups are preferably incorporated into the rubber by adding to the monomer mixture monomers containing dicarboxylic acid groups and/or epoxy groups and having the formula I, II, III or IV

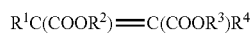 (I)

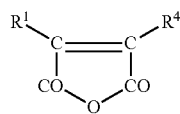 (II)

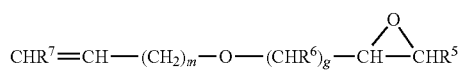 (III)

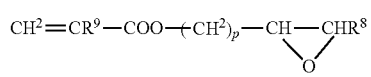 (IV)

where $R^1$ to $R^9$ are hydrogen or alkyl having from 1 to 6 carbon atoms, and m is a whole number from 0 to 20, g is a whole number from 0 to 10 and p is a whole number from 0 to 5.

$R^1$ to $R^9$ are preferably hydrogen, where m is 0 or 1 and g is 1. The corresponding compounds are maleic acid, fumaric acid, maleic anhydride, allyl glycidyl ether and vinyl glycidyl ether.

Preferred compounds of the formulae I, II and IV are maleic acid, maleic anhydride and (meth)acrylates containing epoxy groups, such as glycidyl acrylate and glycidyl methacrylate, and the esters with tertiary alcohols, such as tert-butyl acrylate. Although the latter have no free carboxy groups, their behavior approximates to that of the free acids and they are therefore termed monomers with latent carboxy groups.

The copolymers are advantageously composed of from 50 to 98% by weight of ethylene, from 0.1 to 20% by weight of monomers containing epoxy groups and/or methacrylic acid and/or monomers containing anhydride groups, the remaining amount being (meth)acrylates.

Particular preference is given to copolymers composed of from 50 to 98% by weight, in particular from 55 to 95% by weight, of ethylene, from 0.1 to 40% by weight, in particular from 0.3 to 20% by weight, of glycidyl acrylate and/or glycidyl methacrylate, (meth)acrylic acid and/or maleic anhydride, and from 1 to 45% by weight, in particular from 10 to 40% by weight, of n-butyl acrylate and/or 2-ethylhexyl acrylate.

Other preferred (meth)acrylates are the methyl, ethyl, propyl, isobutyl and tert-butyl esters.

Besides these, comonomers which may be used are vinyl esters and vinyl ethers.

The ethylene copolymers described above may be prepared by processes known per se, preferably by random copolymerization at high pressure and elevated temperature.

Appropriate processes are well known.

Other preferred elastomers are emulsion polymers whose preparation is described, for example, by Blackley in the monograph "Emulsion polymerization". The emulsifiers and catalysts which may be used are known per se.

In principle it is possible to use homogeneously structured elastomers or those with a shell structure. The shell-type structure is determined by the sequence of addition of the individual monomers. The morphology of the polymers is also affected by this sequence of addition.

Monomers which may be mentioned here, merely as examples, for the preparation of the rubber fraction of the elastomers are acrylates, such as n-butyl acrylate and 2-ethylhexyl acrylate, corresponding methacrylates, butadiene and isoprene, and also mixtures of these. These monomers may be copolymerized with other monomers, such as styrene, acrylonitrile, vinyl ethers and with other acrylates or methacrylates, such as methyl methacrylate, methyl acrylate, ethyl acrylate or propyl acrylate.

The soft or rubber phase (with a glass transition temperature of below 0° C.) of the elastomers may be the core, the outer envelope or an intermediate shell (in the case of elastomers whose structure has more than two shells). Elastomers having more than one shell may also have more than one shell made from a rubber phase.

If one or more hard components (with glass transition temperatures above 20° C.) are involved, besides the rubber phase, in the structure of the elastomer, these are generally prepared by polymerizing, as principal monomers, styrene, acrylonitrile, methacrylonitrile, (x-methylstyrene, p-methylstyrene, or acrylates or methacrylates, such as methyl acrylate, ethyl acrylate or methyl methacrylate. Besides these, it is also possible to use relatively small proportions of other comonomers.

It has proven advantageous in some cases to use emulsion polymers which have reactive groups at their surfaces. Examples of groups of this type are epoxy, carboxy, latent carboxy, amino and amide groups, and also functional groups which may be introduced by concomitant use of monomers of the formula

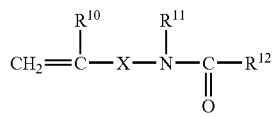

where:
$R^{10}$ is hydrogen or $C_1$-$C_4$-alkyl,
$R^{11}$ is hydrogen or $C_1$-$C_8$-alkyl or aryl, in particular phenyl,
$R^{12}$ is hydrogen, $C_1$-$C_{10}$-alkyl, $C_6$-$C_{12}$-aryl or —$OR^{13}$
$R^{13}$ is $C_1$-$C_8$-alkyl or $C_6$-$C_{12}$-aryl, if desired with substitution by O- or N-containing groups,
X is a chemical bond or $C_1$-$C_{10}$-alkylene or $C_6$-$C_{12}$-arylene, or
Y is O—Z or NH—Z, and

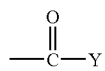

Z is $C_1$-$C_{10}$-alkylene or $C_6$-$C_{12}$-arylene.

The graft monomers described in EP-A 208 187 are also suitable for introducing reactive groups at the surface.

Other examples which may be mentioned are acrylamide, methacrylamide and substituted acrylates or methacrylates, such as (N-tert-butylamino)ethyl methacrylate, (N,N-dimethylamino)ethyl acrylate, (N,N-dimethylamino)methyl acrylate and (N,N-diethylamino)ethyl acrylate.

The particles of the rubber phase may also have been crosslinked. Examples of crosslinking monomers are 1,3-butadiene, divinylbenzene, diallyl phthalate and dihydrodicyclopentadienyl acrylate, and also the compounds described in EP-A 50 265.

It is also possible to use the monomers known as graft-linking monomers, i.e. monomers having two or more polymerizable double bonds which react at different rates during the polymerization. Preference is given to the use of compounds of this type in which at least one reactive group polymerizes at about the same rate as the other monomers, while the other reactive group (or reactive groups), for example, polymerize(s) significantly more slowly. The different polymerization rates give rise to a certain proportion of unsaturated double bonds in the rubber. If another phase is then grafted onto a rubber of this type, at least some of the double bonds present in the rubber react with the graft monomers to form chemical bonds, i.e. the phase grafted on has at least some degree of chemical bonding to the graft base.

Examples of graft-linking monomers of this type are monomers containing allyl groups, in particular allyl esters of ethylenically unsaturated carboxylic acids, for example allyl acrylate, allyl methacrylate, diallyl maleate, diallyl fumarate and diallyl itaconate, and the corresponding monoallyl compounds of these dicarboxylic acids. Besides these there is a wide variety of other suitable graft-linking monomers. For further details reference may be made here, for example, to U.S. Pat. No. 4,148,846.

The proportion of these crosslinking monomers in the impact-modifying polymer is generally up to 5% by weight, preferably not more than 3% by weight, based on the impact-modifying polymer.

Some preferred emulsion polymers are listed below. Mention may first be made here of graft polymers with a core and with at least one outer shell, and having the following structure:

| Type | Monomers for the core | Monomers for the envelope |
|---|---|---|
| I | buta-1,3-diene, isoprene, n-butyl acrylate, ethylhexyl acrylate, or a mixture of these | styrene, acrylonitrile, methyl methacrylate |
| II | as I, but with concomitant use of crosslinking agents | as I |
| III | as I or II | n-butyl acrylate, ethyl acrylate, methyl acrylate, buta-1,3-diene, isoprene, ethylhexyl acrylate |
| IV | as I or II | as I or III, but with concomitant use of monomers having reactive groups, as described herein |
| V | styrene, acrylonitrile, methyl methacrylate, or a mixture of these | first envelope made of monomers as described under I and II for the core, second envelope as described under I and IV for the envelope |

These graft polymers, in particular ABS polymers and/or ASA polymers, are preferably used in amounts of up to 40% by weight for the impact-modification of PBT, if appropriate in a mixture with up to 40% by weight of polyethylene terephthalate. Blend products of this type are obtainable with the trademark Ultradur®S (previously Ultrablend®S from BASF AG).

Instead of graft polymers whose structure has more than one shell, it is also possible to use homogeneous, i.e. single-shell, elastomers made from 1,3-butadiene, isoprene and n-butyl acrylate or from copolymers of these. These products, too, may be prepared by concomitant use of crosslinking monomers or of monomers having reactive groups.

Examples of preferred emulsion polymers are n-butyl acrylate-(meth)acrylic acid copolymers, n-butyl acrylate-glycidyl acrylate or n-butyl acrylate-glycidyl methacrylate copolymers, graft polymers with an inner core made from n-butyl acrylate or based on butadiene and with an outer envelope made from the abovementioned copolymers, and copolymers of ethylene with comonomers which supply reactive groups.

The elastomers described may also be prepared by other conventional processes, e.g. by suspension polymerization.

Preference is also given to silicone rubbers, as described in DE-A 37 25 576, EP-A 235 690, DE-A 38 00 603 and EP-A 319 290.

It is, of course, also possible to use mixtures of the types of rubber listed above.

Fibrous or particulate fillers C) which may be mentioned are carbon fibers, glass fibers, glass beads, amorphous silica, asbestos, calcium silicate, calcium metasilicate, magnesium carbonate, kaolin, chalk, powdered quartz, mica, barium sulfate and feldspar, used in amounts of up to 50% by weight, in particular up to 40% by weight.

Preferred fibrous fillers which may be mentioned are carbon fibers, aramid fibers and potassium titanate fibers, and particular preference is given to glass fibers in the form of E glass. These may be used as rovings or in the commercially available forms of chopped glass.

Mixtures of glass fibers D) with component B) in a ratio of from 1:100 to 1:2, and preferably from 1:10 to 1:3, are particularly preferred.

The fibrous fillers may have been surface-pretreated with a silane compound to improve compatibility with the thermoplastic.

Suitable silane compounds have the formula:

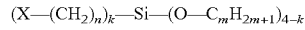

where:

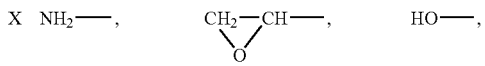

n is a whole number from 2 to 10, preferably 3 to 4,
m is a whole number from 1 to 5, preferably 1 to 2, and
k is a whole number from 1 to 3, preferably 1.

Preferred silane compounds are aminopropyltrimethoxysilane, aminobutyltrimethoxysilane, aminopropyltriethoxysilane and aminobutyltriethoxysilane, and also the corresponding silanes which contain a glycidyl group as substituent X.

The amounts of the silane compounds generally used for surface-coating are from 0.05 to 5% by weight, preferably from 0.5 to 1.5% by weight and in particular from 0.8 to 1% by weight (based on C).

Acicular mineral fillers are also suitable.

For the purposes of the invention, acicular mineral fillers are mineral fillers with strongly developed acicular character. An example is acicular wollastonite. The mineral preferably has an L/D (length to diameter) ratio of from 8:1 to 35:1, preferably from 8:1 to 11:1. The mineral filler may, if desired, have been pretreated with the abovementioned silane compounds, but the pretreatment is not essential.

Other fillers which may be mentioned are kaolin, calcined kaolin, wollastonite, talc and chalk.

As component C), the thermoplastic molding compositions of the invention may comprise the usual processing aids, such as stabilizers, oxidation retarders, agents to counteract decomposition due to heat and decomposition due to ultraviolet light, lubricants and mold-release agents, colorants, such as dyes and pigments, nucleating agents, plasticizers, etc.

Examples which may be mentioned of oxidation retarders and heat stabilizers are sterically hindered phenols and/or phosphites, hydroquinones, aromatic secondary amines, such as diphenylamines, various substituted members of these groups, and mixtures of these in concentrations of up to 1% by weight, based on the weight of the thermoplastic molding compositions.

UV stabilizers which may be mentioned, and are generally used in amounts of up to 2% by weight, based on the molding composition, are various substituted resorcinols, salicylates, benzotriazoles, and benzophenones.

Colorants which may be added are inorganic pigments, such as titanium dioxide, ultramarine blue, iron oxide, and carbon black, and also organic pigments, such as phthalocyanines, quinacridones and perylenes, and also dyes, such as nigrosine and anthraquinones.

Nucleating agents which may be used are sodium phenylphosphinate, alumina, silica, and preferably talc.

Other lubricants and mold-release agents are usually used in amounts of up to 1% by weight. Preference is given to long-chain fatty acids (e.g. stearic acid or behenic acid), salts of these (e.g. calcium stearate or zinc stearate) or montan waxes (mixtures of straight-chain saturated carboxylic acids having chain lengths of from 28 to 32 carbon atoms), or calcium montanate or sodium montanate, or low-molecular-weight polyethylene waxes or low-molecular-weight polypropylene waxes.

Examples of plasticizers which may be mentioned are dioctyl phthalates, dibenzyl phthalates, butyl benzyl phthalates, hydrocarbon oils and N-(n-butyl)benzene-sulfonamide.

The inventive molding compositions may also comprise from 0 to 2% by weight of fluorine-containing ethylene polymers. These are polymers of ethylene with a fluorine content of from 55 to 76% by weight, preferably from 70 to 76% by weight.

Examples of these are polytetrafluoroethylene (PTFE), tetrafluoroethylene-hexafluoropropylene copolymers and tetrafluoroethylene copolymers with relatively small proportions (generally up to 50% by weight) of copolymerizable ethylenically unsaturated monomers. These are described, for example, by Schildknecht in "Vinyl and Related Polymers", Wiley-Verlag, 1952, pages 484-494 and by Wall in "Fluoropolymers". (Wiley Interscience, 1972).

These fluorine-containing ethylene polymers have homogeneous distribution in the molding compositions and preferably have a particle size $d_{50}$ (numeric median) in the range from 0.05 to 10 μm, in particular from 0.1 to 5 μm. These small particle sizes may particularly preferably be achieved by the use of aqueous dispersions of fluorine-containing ethylene polymers and the incorporation of these into a polyester melt.

The inventive thermoplastic molding compositions may be prepared by methods known per se, by mixing the starting components in conventional mixing apparatus, such as screw extruders, Brabender mixers or Banbury mixers, and then extruding them. The extrudate may be cooled and comminuted. It is also possible to premix individual components and then to add the remaining starting materials individually and/or likewise in a mixture. The mixing temperatures are generally from 230 to 290° C.

In another preferred method of operation, components B) and, if appropriate, C) may be mixed with a polyester prepolymer, compounded, and pelletized. The resultant pellets are then solid-phase-condensed, continuously or batchwise, under an inert gas, at a temperature below the melting point of component A) until the desired viscosity has been reached.

The inventive thermoplastic molding compositions feature good flowability together with good mechanical properties.

In particular, the processing of the individual components (without clumping or caking) is problem-free and possible within short cycle times, so that a particular application that can be considered is thin-walled components.

These are suitable for the production of fibers, films, and moldings of any type, in particular for applications as tailgates, switches, housing parts, housing covers, headlamp background (bezel), shower head, fittings, smoothing irons, rotary switches, stove controls, fryer lids, door handles, (rear) mirror housings, (tailgate) screen wipers, sheathing for optical conductors.

EXAMPLES

Component A/1:
Polybutylene terephthalate with a viscosity number VN of 130 ml/g and carboxy end group content of 34 mval/kg (Ultradur® B 4520 from BASF AG) (VN measured in 0.5% strength by weight solution in phenol/o-dichlorobenzene), 1:1 mixture) at 25° C., comprising 0.65% by weight of pentaerythrityl tetrastearate (component C1, based on 100% by weight of A)

Component A/2:
Polyethylene terephthalate PET with a VN of 74.5 ml/g.

Component A/3:
Polytrimethylene terephthalate with a VN of 106 ml/g.

Component A/4:
Polycarbonate based on bisphenol A and diphenyl carbonate with a VN of 59 ml/g.

Component A/5:
PBT with VN 130 ml/g, but without component C1.

Components B:

|  | Monomers | Mn (g/mol) | Mw (g/mol) | OH number (mg KOH/g) | Acid number (mg KOH/g) |
|---|---|---|---|---|---|
| B/1 | Adipic acid and glycerol | 1900 | 6910 | 416 | 31 |
| B/2 | Adipic acid and glycerol | 1730 | 2580 | 295 | 167 |
| B/3 | Adipic acid and glycerol | 4370 | 18220 | 248 | 93 |
| B/4 | Dimethyl terephthalate and glycerol | 400 | 1140 | 273 | — |
| B/5 | Adipic acid and TMP | 2450 | 12260 | 213 | 83 |
| B/6 | Adipic acid and TMP | 2470 | 12570 | 216 | 106 |

TMP: 1,1,1-Tris(hydroxymethyl)propane

Preparation of B/1:

1645 g (11.27 mol) of adipic acid and 868 g (9.43 mol) of glycerol formed an initial charge in a 5 l glass flask which had been equipped with stirrer, internal thermometer, gas inlet tube, reflux condenser, and vacuum connection with cold trap. 2.5 g of di-n-butyltin oxide commercially available as Fascat® 4201 were added, and the mixture was heated with the aid of an oil bath to an internal temperature of 140° C. A reduced pressure of 250 mbar was applied in order to remove water formed during the reaction. The reaction mixture was kept for 4 hours at the stated temperature and the stated pressure, and then the pressure was lowered to 100 mbar and the mixture was kept for a further 6 hours at 140° C. After 8.5 hours, 383 g (4.16 mol) of glycerol were added. The pressure was then lowered to 20 mbar, and the mixture was kept for a further 5 hours at 140° C. It was then cooled to room temperature. This gave 2409 g of hyperbranched polyester in the form of a clear, viscous liquid. The analytical data are given in Table 1.

Preparation of B/2:

2016 g (13.81 mol) of adipic acid and 1059 g (11.51 mol) of glycerol formed an initial charge in a 5 l glass flask which had been equipped with stirrer, internal thermometer, gas inlet tube, reflux condenser, and vacuum connection with cold trap. 3.04 g of di-n-butyltin oxide commercially available as Fascat® 4201 were added, and the mixture was heated with the aid of an oil bath to an internal temperature of 125° C. A reduced pressure of 100 mbar was applied in order to remove water formed during the reaction. The reaction mixture was kept for 11 hours at the stated temperature and the stated pressure. It was then cooled to room temperature. This gave 2645 g of hyperbranched polyester in the form of a clear, viscous liquid. The analytical data are given in Table 1.

Preparation of B/3:

2016 g (13.81 mol) of adipic acid and 1059 g (11.51 mol) of glycerol formed an initial charge in a 5 l glass flask which had been equipped with stirrer, internal thermometer, gas inlet tube, reflux condenser, and vacuum connection with cold trap. 3.04 g of di-n-butyltin oxide commercially available as Fascat® 4201 were added, and the mixture was heated with the aid of an oil bath to an internal temperature of 150° C. A reduced pressure of 100 mbar was applied in order to remove water formed during the reaction. The reaction mixture was kept for 9.5 hours at the stated temperature and the stated pressure. It was then cooled to room temperature. This gave 2511 g of hyperbranched polyester in the form of a clear, viscous liquid. The analytical data are given in Table 1.

Preparation of B/4:

1589 g (8.19 mol) of dimethyl terephthalate and 628 g (6.83 mol) of glycerol formed an initial charge in a 5 l glass flask which had been equipped with stirrer, internal thermometer, gas inlet tube, reflux condenser, and vacuum connection with cold trap. 4.4 g of di-n-butyltin oxide commercially available as Fascat® 4201 were added, and the mixture was heated with the aid of an oil bath to an internal temperature of 140° C. A reduced pressure of 50 mbar was applied in order to remove water formed during the reaction. The reaction mixture was kept for 34 hours at the stated temperature and the stated pressure. It was then cooled to room temperature. This gave . . . g of hyperbranched polyester in the form of a clear, viscous liquid. The analytical data are given in Table 1.

Preparation of B/5:

2000 g (13.70 mol) of adipic acid and 1530 g (11.42 mol) of 1,1,1-tris(hydroxymethyl)-propane (TMP) formed an initial charge in a 5 l glass flask which had been equipped with stirrer, internal thermometer, gas inlet tube, reflux condenser, and vacuum connection with cold trap. 3.53 g of di-n-butyltin oxide commercially available as Fascat® 4201 were added, and the mixture was heated with the aid of an oil bath to an internal temperature of 135° C. A reduced pressure of 500 mbar was applied in order to remove water formed during the reaction. The reaction mixture was kept for 3.5 hours at the stated temperature and the stated pressure, and then the pressure was lowered to 300 mbar and the mixture was kept for a further 5.5 hours at 140° C. It was then cooled to room temperature. This gave 3093 g of hyperbranched polyester in the form of a clear, viscous liquid. The analytical data are given in Table 1.

Preparation of B/6:

2000 g (13.70 mol) of adipic acid and 1530 g (11.42 mol) of TMP formed an initial charge in a 5 l glass flask which had been equipped with stirrer, internal thermometer, gas inlet tube, reflux condenser, and vacuum connection with cold trap. 3.53 g of di-n-butyltin oxide commercially available as Fascat® 4201 were added, and the mixture was heated with the aid of an oil bath to an internal temperature of 135° C. A reduced pressure of 500 mbar was applied in order to remove water formed during the reaction. The reaction mixture was kept for 4 hours at the stated temperature and the stated pressure, and then the pressure was lowered to 200 mbar and the mixture was kept for a further 5 hours at 140° C. It was then cooled to room temperature. This gave 3100 g of hyperbranched polyester in the form of a clear, viscous liquid. The analytical data are given in Table 1.

Component B/1c (For Comparison)

Hyperbranched polyester composed of dimethylolpropionic acid according to WO 97/45474 with:

| Mn | 1600 |
|---|---|
| Mw | 2100 |
| Tg | 40 |
| COOH: 6.1 mg KOH/g | OH: 488 mg KOH/g |
| (Boltorn ® H30 from Perstorp AB, Sweden) | |

Component C/2:

Chopped glass fibers with an average thickness of 10 μm

Preparation of molding compositions

Components A) to C) were blended in a twin-screw extruder at from 250 to 260° C. and extruded into a water bath. After pelletizing and drying, test specimens were injection molded and tested.

MVR was determined to ISO 1133, modulus of elasticity to ISO 527-2, Charpy impact strength to ISO 179-2/1eU, and VN to DIN 53728 or ISO 1628.

The inventive compositions and the results of the measurements are found in the tables.

TABLE 1

| Components [% by weight] | 1 | 2 | 3 | 4 | 5 | 6 |
|---|---|---|---|---|---|---|
| A/1 | 95 | | | | | 65 |
| A/5 | | 95 | | | | |
| A/2 | | | 95 | | | |
| A/3 | | | | 95 | | |
| A/4 | | | | | 95 | |
| B/5 | 5 | 5 | 5 | 5 | 5 | 5 |
| C/2 | | | | | | 30 |
| VN | 117 | 117.5 | 66.4 | 102.8 | 60.3 | 118 |
| MVR | 171 | 139 | >250 | 225 | 160 | 53.7 |
| Flow spiral 260/80° C. - 2 mm (mm) | 48 | 48 | 33 | 59 | 21 | 36 |

TABLE 2

| | 7 | 8 |
|---|---|---|
| A/1 | 99 | 96 |
| B/4 | 1.00 | 4.00 |
| VN | 105.7 | 102.8 |
| MVR | 97.4 | >250 |
| Flow spiral 260/80° C. - 2 mm (mm) | 46 | 92 |

TABLE 2-continued

| | 7 | 8 |
|---|---|---|
| Mechanical properties | | |
| Stress at max.: (N/mm) | 57.5 | 51.55 |
| Tensile strain at yield (%) | 3.7 | 2.1 |
| Modulus of elasticity: (N/mm) | 2549 | 2721 |
| Impact strength - notched (kJ/m$^2$) | 2.3 | 1.3 |

TABLE 3

| | 1c | 9 | 10 | 11 |
|---|---|---|---|---|
| A/1 | 100 | 99 | 98 | 97 |
| B/1 | | 1 | 2 | 3 |
| Analysis | | | | |
| VN | 119 | 122 | 121 | 114 |
| MVR[1] | 29.6 | 26.3 | 32.8 | 45.8 |
| Mechanical properties | | | | |
| Stress at break (N/mm$^2$) | 56.2 | 56.2 | 53.7 | 56.2 |
| Tensile strain at yield (%) | 3.6 | 3.6 | 4.1 | 3.6 |
| Modulus of elasticity (N/mm$^2$) | 2488 | 2533 | 2377 | 2297 |
| Notched impact strength (23° C.) (kJ/m$^2$) | 4.3 | 4.3 | 3.5 | 4.3 |
| Flow spiral 260/60° C. 2 mm (cm) | 35.0 | 34.4 | 41.0 | 47.1 |

[1]MVR at 275°/2.16 kg

TABLE 4

| | 12 | 13 | 14 | 15 | 16 | 17 | 1c |
|---|---|---|---|---|---|---|---|
| A/1 | 99 | 97 | 95 | 99 | 97 | 95 | 100 |
| B/2 | 1 | 3 | 5 | | | | |
| B/3 | | | | 1 | 3 | 5 | |
| Analysis | | | | | | | |
| VN | 115 | 115 | 113 | 115 | 116 | 109 | 119 |
| Mechanical properties | | | | | | | |
| Stress at max.: (N/mm) | 56.3 | 54.5 | 52.9 | 55.9 | 54.5 | 52.6 | 56.2 |
| Tensile strain at yield (%) | 23.6 | 3.8 | 4 | 3.6 | 3.7 | 4 | 3.5 |
| Modulus of elasticity (N/mm) | 2492 | 2354 | 2304 | 2469 | 2410 | 2326 | 2488 |
| Impact strength (kJ/m$^2$) | 88 | 147 | 124 | 144 | 173 | 173 | 199 |
| Notched impact strength (kJ/m$^2$) | 5 | 5.9 | 6.1 | 5.6 | 5.9 | 6.1 | 4.3 |
| Flow spiral 260/80° C. - 2 mm (cm) | 42 | 45 | 46 | 42 | 43 | 45 | 35 |

TABLE 5

| Components (% by weight) | 1c | 2c | 3c |
|---|---|---|---|
| A/1 | 99 | 97 | 95 |
| B/1c | 1.00 | 3.00 | 5.00 |
| VN | 125.6 | 140.5 | 120.7 |
| MVR | 64.2 | 110 | 105 |
| DSC | | | |
| GPC | | | |
| Mechanical properties | | | |
| Stress at max.: (N/mm) | | | |
| Tensile strain at break/yield (%) | | | |
| Modulus of elasticity (N/mm) | | | |
| Impact strength (−30° C.) (kJ/m$^2$) | 156 | 118 | 61.5 |
| Impact strength - notched (kJ/m$^2$) | 2.5 | 2.2 | 2 |
| Flow spiral 260/80° C. - 2 mm (mm) | 43 | 43.5 | 46.2 |

The invention claimed is:

1. A thermoplastic molding composition comprising:
   A) from 10 to 99.99% by weight of at least one thermoplastic polyester;
   B) from 0.01 to 20% by weight of a hyperbranched $A_xB_y$ polyester,
   wherein $A_x$ and $B_y$ are different monomers and indices x and y are the number of functional groups present in A and B, wherein x is at least 1.1 and y is at least 2.1,
   wherein B) has an OH number (DIN 53240) of from 0 to 600 mg KOH/g and a COOH number (to DIN 53240) of from 0 to 600 mg KOH/g, wherein B) has a glass transition temperature $T_g$ of from −50° C. to 140° C.,
   wherein a degree of branching of B) is from 10 to 99.9%, and wherein B) has both structural and molecular non-uniformity,
   C) from 0 to 60% by weight of other additives,
   where the total of the percentages by weight of components A) to C) is 100%.

2. The thermoplastic molding composition according to claim 1, wherein B) has a number-average molar mass $M_n$ of from 300 to 30 000 g/mol.

3. The thermoplastic molding composition according to claim 1, wherein B) at least has an OH number or a COOH number greater than 0.

4. The thermoplastic molding composition according to claim 1, wherein B) has an OH number of from 1 to 500 mg KOH/g.

5. The thermoplastic molding composition according to claim 1, wherein B) has a COOH number of from 1 to 500 mg KOH/g of polyester.

6. The thermoplastic molding composition according to claim 1, wherein the degree of branching is from 20 to 99%.

7. The thermoplastic molding composition according to claim 1, wherein the degree of branching is from 20 to 95%.

8. The thermoplastic molding composition according to claim 1, wherein B) has an $M_n$ of from 300 to 30 000 g/mol.

9. The thermoplastic molding composition according to claim 1, wherein B) has an $M_n$ of from 400 to 25 000 g/mol.

10. The thermoplastic molding composition according to claim 1, wherein the maximum amount of B) is 10% by weight.

11. The thermoplastic molding composition according to claim 1, wherein B) is obtainable by reacting
    (a) one or more dicarboxylic acids or one or more derivatives of the same with one or more at least trihydric alcohols
    or
    (b) one or more tricarboxylic acids or higher polycarboxylic acids or one or more derivatives of the same with one or more diols
    if appropriate in the presence of a solvent and optionally in the presence of an acidic inorganic, organometallic, or organic catalyst, or of an enzyme.

12. The thermoplastic molding composition according to claim 11, where, when variant (a) is utilized, use is made of an at least trihydric alcohol which has hydroxyl groups having at least two different chemical reactivities.

13. The thermoplastic molding composition according to claim 11, where, when variant (a) is utilized, use is made of an at least trihydric alcohol which has hydroxy groups which all have identical chemical reactivity.

14. The thermoplastic molding composition according to claim 11, where when variant (b) is utilized an at least trihydric alcohol which has hydroxy groups all of which have identical chemical reactivity is used.

15. The thermoplastic molding composition according to claim 11, where when variant (b) is utilized an at least one tricarboxylic acid or polycarboxylic acid which has carboxy groups having at least two different reactivities is used.

16. A method for producing fibers, films, or moldings comprising utilizing the thermoplastic molding composition according to claim 1.

17. A fiber, a film, or a molding of any type obtainable from the thermoplastic molding compositions according to claim 1.

* * * * *